(12) United States Patent
Park et al.

(10) Patent No.: US 10,224,719 B2
(45) Date of Patent: Mar. 5, 2019

(54) ENERGY MANAGEMENT SYSTEM FOR RESIDENTIAL COMMUNITY

(71) Applicant: Electronics and Telecommunications Research Institute, Daejeon (KR)

(72) Inventors: Wan Ki Park, Daejeon (KR); Il Woo Lee, Daejeon (KR); Chang Sic Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 281 days.

(21) Appl. No.: 15/142,673

(22) Filed: Apr. 29, 2016

(65) Prior Publication Data
US 2016/0322823 A1 Nov. 3, 2016

(30) Foreign Application Priority Data
Apr. 30, 2015 (KR) .................. 10-2015-0061661

(51) Int. Cl.
*H02J 3/28* (2006.01)
*G05B 15/02* (2006.01)
*G06Q 30/04* (2012.01)

(52) U.S. Cl.
CPC .............. *H02J 3/28* (2013.01); *G05B 15/02* (2013.01); *G06Q 30/04* (2013.01)

(58) Field of Classification Search
CPC ............ H02J 3/28; G05B 15/02; G06Q 30/04
USPC .................................. 700/287–300
See application file for complete search history.

(56) References Cited

U.S. PATENT DOCUMENTS

| 2012/0165988 A1 | 6/2012 | Choi et al. |
| 2012/0166004 A1 | 6/2012 | Park et al. |
| 2012/0206273 A1* | 8/2012 | Kim .................. H02J 3/14 340/870.02 |

(Continued)

FOREIGN PATENT DOCUMENTS

| KR | 1020120075508 A | 7/2012 |
| KR | 1020130109643 A | 10/2013 |

(Continued)

OTHER PUBLICATIONS

Wan Ki Park et al., "Home electronic system (HES) application model—Part 3-1:Model of an Energy Management System for a Residential Complex", International Standard ISO/IEC 15067-3-1, Jun. 21, 2014, pp. 1-31.

*Primary Examiner* — Ziaul Karim
(74) *Attorney, Agent, or Firm* — William Park & Associates Ltd.

(57) ABSTRACT

Provided herein is a system for managing energy of a residential community sharing energy, the system including a plurality of home EMS (Energy Management System) provided in individual households; a unit for supplying common use energy having a production unit configured to produce common use energy, and a storage unit for charging the produced common use energy; and a residential community EMS configured to manage production and charging of the common use energy, and to control the unit for supplying the common use energy, in response to receiving a signal requesting to use the common use energy transmitted from a home EMS supply, supply the common use energy to the home EMS that transmitted the signal requesting to use the common use energy.

4 Claims, 3 Drawing Sheets

(56) References Cited

U.S. PATENT DOCUMENTS

| | | | |
|---|---|---|---|
| 2012/0215370 A1* | 8/2012 | Seo | H04L 12/12 |
| | | | 700/296 |
| 2012/0226387 A1* | 9/2012 | Kawaguchi | H02J 3/32 |
| | | | 700/295 |
| 2013/0079940 A1* | 3/2013 | Yonezawa | G06Q 50/06 |
| | | | 700/291 |
| 2013/0204454 A1* | 8/2013 | Choi | G06Q 10/08 |
| | | | 700/295 |
| 2013/0289790 A1 | 10/2013 | Park | |
| 2013/0345888 A1* | 12/2013 | Forbes, Jr. | H02J 3/14 |
| | | | 700/291 |
| 2014/0129040 A1* | 5/2014 | Emadi | G06Q 50/06 |
| | | | 700/291 |
| 2015/0241896 A1* | 8/2015 | Nishibayashi | G05B 15/02 |
| | | | 700/286 |

FOREIGN PATENT DOCUMENTS

| | | |
|---|---|---|
| KR | 1020130120657 A | 11/2013 |
| KR | 1020130142010 A | 12/2013 |

* cited by examiner

ENERGY MANAGEMENT SYSTEM FOR RESIDENTIAL COMMUNITY

CROSS-REFERENCE TO RELATED APPLICATION

The present application claims priority to Korean patent application number 10-2015-0061661 filed on Apr. 30, 2015, the entire disclosure of which is incorporated herein in its entirety by reference.

BACKGROUND

1. Field of Invention

Various embodiments of the present disclosure relate to an energy management system for a residential community that shares electrical resources, and more particularly, to an energy management system for a residential community such as an apartment where multiple households reside and share the electrical energy generated under a public joint ownership concept.

2. Description of Related Art

Generally, electricity utility fees that are charged to general consumers are based on differentiated costs per unit of electricity usage depending on the different levels of accumulated usage. That is, electricity fees for residential energy are divided into basic fees and electricity amount fees, and these fees are charged according to the accumulated amount of electricity consumption as shown in Table 1 below.

TABLE 1

Residential use (As of Nov., 21, 2013)

| Basic fees(unit/won) | | Electricity amount fees (won/kW) | |
|---|---|---|---|
| Less than 100 kW | 410 | Until next 100 kWh | 90.7 |
| 101~200 kWh used | 910 | Until next 100 kWh | 125.9 |
| 201~300 kWh used | 1,600 | Until next 100 kWh | 187.9 |
| 301~400 kWh used | 3,850 | Until next 100 kWh | 280.6 |
| 401~500 kWh used | 7,300 | Until next 100 kWh | 417.7 |
| More than 500 kWh used | | More than 500 kWh | 709.5 |

Differentiating the basic fees and unit fees for each accumulative level as shown above is intended to induce system stabilization and reduction of energy consumption in the overall electricity system. Such a fee system may result in an unexpected amount of increase of fees depending on the accumulative level or level of consumption of each user, and thus consumers need to be very attentive, Furthermore, such a system may become a great pressure to the consumers both economically and psychologically.

Currently, as smart grid technologies have diffused rapidly in consumer domains, electricity production and storage devices are becoming more widespread. And an ICT (Information and Communication Technology) environment is being established for efficient use of such production and storage devices. Based on improved electricity production and storage capabilities and information processing technologies under the smart grid environment, there is ongoing research to develop ways to produce for itself the electricity for common use that is inexpensive than the electricity supplied from electrical energy operators, and to store and utilize the electrical energy for common use effectively.

SUMMARY

A purpose of the present disclosure is to provide an energy management system for a residential community that share energy such as an apartment such that the energy produced for public interest may be shared efficiently.

According to an embodiment of the present disclosure, there is provided an energy management system for a residential community that shares energy, the system including a plurality of home EMS (Energy Management System) provided in individual households; a unit for supplying common use energy having a unit for producing common use energy, and a storage unit for charging the produced common use energy; and a residential community EMS configured to manage production and charging of the common use energy, and in response to receiving a signal requesting to use the common use energy transmitted from a home EMS supply, to control the unit for supplying the common use energy to supply the common use energy to the home EMS that transmitted the signal requesting to use the common use energy.

In an embodiment, each of the plurality of home EMS may include an individual household energy meter function for measuring an amount of usage of energy being consumed in each individual household. In an embodiment, the residential community EMS may collect and manage measurement values of the energy meter provided in each of the plurality of home EMS either at certain intervals or in real time. In an embodiment, the residential community EMS and the plurality of home EMS may divide the measurement values of individual household energy meters into an amount of usage of external energy supplied from an energy operator and an amount of usage of common use energy supplied from the unit for supplying common use energy, and manage them separately.

In an embodiment, the unit for supplying common use energy may include a production apparatus energy metering function for measuring an amount of energy usage of common use energy being supplied to the plurality of home EMS.

In an embodiment, the residential community EMS may receive external energy from an energy operator through an energy grid, and include a supervisory energy meter for measuring the amount of usage of the external energy.

In an embodiment, the residential community EMS may determine a unit fee of the common use energy based on the amount of usage of the common use energy and the amount of usage of all of the plurality of home EMS, and notify the determined unit fee to the plurality of home EMS.

In an embodiment, the residential community EMS may compute the unit fee of the common use energy based on the amount of usage of the common use energy and the unit fee of the common use energy of each of the plurality of EMS, and request each home EMS to settle the computed the unit fee of the common use energy.

In an embodiment, each of the plurality of EMS may compare the computed unit fee of the external energy based on an accumulative fee system of the energy operator and the unit fee of the common use energy, and in response to determining that the unit fee of the common use energy is less expensive, generate a signal requesting the residential community EMS to use the common use energy. In an embodiment, each of the plurality of EMS may predict an energy usage amount and energy fee of itself, and make reservations beforehand for using the common use energy at a predetermined time.

In an embodiment, the home EMS, unit for supplying common use energy, and residential community EMS may be connected via a CAN (Controller Area Network).

According to the present disclosure, under the control and management of the residential community EMS (Energy Management System) energy, individual households within the residential community may use the common use energy produced under a shared ownership concept within the residential community having a smart grid environment, and a unit price of the common use energy may be set to be lower than the unit price of external energy provided from energy operators, thereby saving the energy costs for the individual households within the residential community.

Furthermore, the energy produced within the residential community may be used efficiently, and thus the amount of energy being supplied from an electricity system may be reduced, thereby stabilizing the electric system.

BRIEF DESCRIPTION OF THE DRAWINGS

The above and other features and advantages of the present disclosure will become more apparent to those of ordinary skill in the art by describing in detail embodiments with reference to the attached drawings in which.

DETAILED DESCRIPTION

Figure 1:
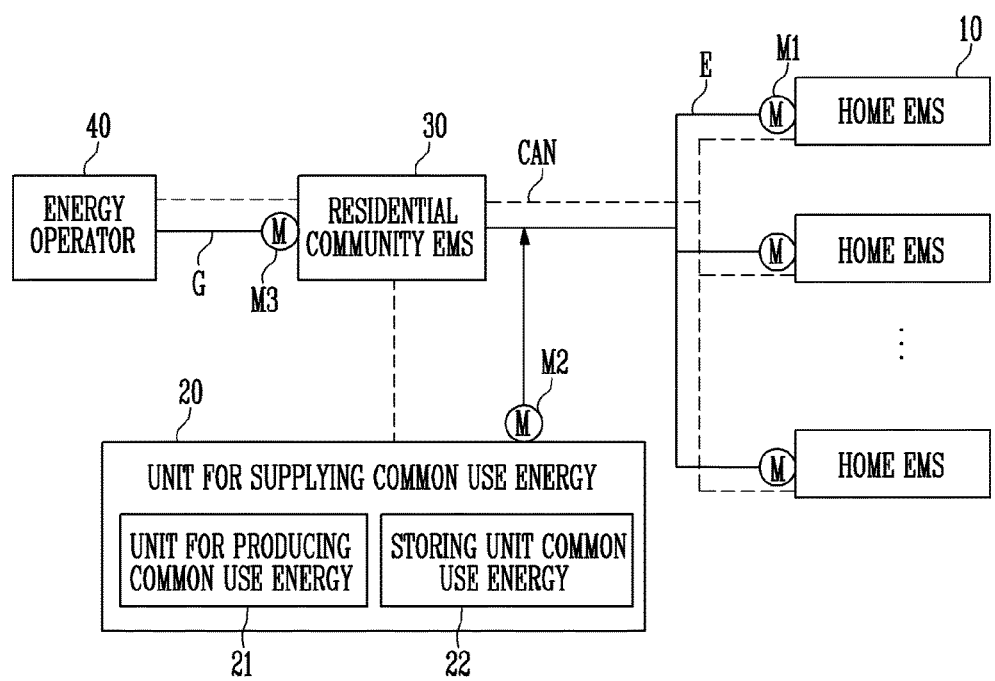
FIG. 1 is a view schematically illustrating an energy management system for a residential community that shares energy resources according to an embodiment of the present disclosure.

Hereinafter, embodiments will be described in greater detail with reference to the accompanying drawings. Embodiments are described herein with reference to cross-sectional illustrates that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present invention. Furthermore, 'and/or' may include any one of or a combination of the components mentioned.

Furthermore, 'connected/accessed' represents that one component is directly connected or accessed to another component or indirectly connected or accessed through another component.

In this specification, a singular form may include a plural form as long as it is not specifically mentioned in a sentence.

Furthermore, 'include/comprise' or 'including/comprising' used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, embodiments of the present disclosure will be explained in detail with reference to the drawings attached.

FIG. 1 is a view schematically illustrating an energy management system for a residential community that shares energy resources according to an embodiment of the present disclosure.

Referring to FIG. 1, the energy management system for a residential community that shares energy resources according to an embodiment of the present disclosure includes a home energy management system (hereinafter referred to as EMS) 10, unit for supplying common use energy 20, and residential community EMS 30.

The home EMS 10 is an energy management system that may be provided in each individual household within a residential community. Each of a plurality of home EMS 10 may include a separate household energy meter M1 for measuring the amount of energy consumed in each individual household. More specifically, a residential community includes a plurality of households, and the home EMS 10 is a system that operates in an interlocked manner with electrical devices inside households to store, monitor, control and manage energy. A residential community means a community configured such that numerous households can live independently in one building. It refers to residential buildings where walls, corridors, stairs, and other facilities and the like are shared by the households living in there. For example, at least one of an apartment, officetel, row house, multiplex house, multi-household house, and dormitory may be included in the residential community. Furthermore, within the range of a residential community, a local community where certain spaces are designated as common use living space may be included. In the present embodiment, an assumption has been made that the residential community is an apartment, but there is no limitation to the residential community which the energy management system can apply to.

The unit for supplying common use energy 20 includes a unit for producing common use energy 21, and a storage unit 22 to be charged with the produced common use energy. The unit for supplying common use energy 20 may include a production apparatus energy meter M2 for measuring an amount of the common use energy being supplied to a plurality of home EMS 10. Herein, the common use energy is energy being produced within a residential community under a public shared ownership concept. It is sold or shared inexpensively within the residential community. Furthermore, the unit for supplying common use energy 20 may further include an energy conversion device (not illustrated) that is controlled by the residential community EMS 30 to convert the stored common use energy into suitable energy so as to be supplied to necessary places.

The unit for producing common use energy 21 is a power plant that produces common use energy using energy sources. The unit for producing common use energy 21 supplies the produced common use energy to the storage unit for common use energy 22. The unit for producing common use energy 21 may be a solar energy generation system, wind energy generation system, or tidal power generation system. However, this is a mere example, and thus the unit for producing common use energy 21 is not limited the aforementioned systems. For example, the unit for producing common use energy 21 may include any kind of generation system that produces energy using new renewable energy resources.

The storage unit for common use energy 22 may consist of mass volume batteries. The storage unit for common use energy 22 may receive common use energy from the unit for producing common use energy 21 and store the same, and supply the stored common use energy to outside.

The residential community EMS 30 manages production and charging of common use energy, and in response to receiving a signal requesting to use common use energy from any home EMS 10, the residential community EMS 30 controls the unit for supplying common use energy 20 to supply common use energy to the home EMS 10 that transmitted the signal. Furthermore, the residential community EMS 30 may include a supervisory energy meter M3 configured to receive external energy from an energy operator 40 through an energy grid G and to measure the amount of external energy used. Herein, examples of the energy grid G include power plant, energy substation, power line and the like. In another embodiment, the residential community EMS 30 may receive external energy at a time of the day when the energy supply price is most inexpensive, store the external energy in the storage unit for common use energy 22, and utilize the stored external energy as common use energy.

The residential community EMS 30 may collect and manage, in real time or on a regular basis, measurement values of an individual household energy meter M1 provided in each of the plurality of home EMS 10. Furthermore, the common use residential community EMS 30 may determine a unit fee of the common use energy based on the amount of common use energy produced and the total amount of energy used in the plurality of home EMS 10, and then notify the plurality of home EMS 10 of the determined unit fee. Furthermore, the residential community EMS 30 may compute a common use energy fee based on the amount of common use energy used in each of the plurality of home EMS 10 and a predetermined unit fee of the common use energy, and then request each home EMS 10 to settle the computed common use energy fee. The residential community EMS 30 of the present disclosure may include at least one managing server and database. Furthermore, the residential community EMS 30 may include another type of server.

The plurality of home EMS 10, unit for supplying common use energy 20 and residential community EMS 30 that constitute the energy management system for a residential community that shares energy resources may be connected through a CAN (Community Area Network). However, although it was explained in the embodiments of the present disclosure that each component communicates using the CAN communication network, there is no limitation thereto. Besides the CAN communication network, the internet, broadcasting network, telephone network and the like may be used, and in fact any communication method may be used either wiredly or wirelessly.

Figure 2:
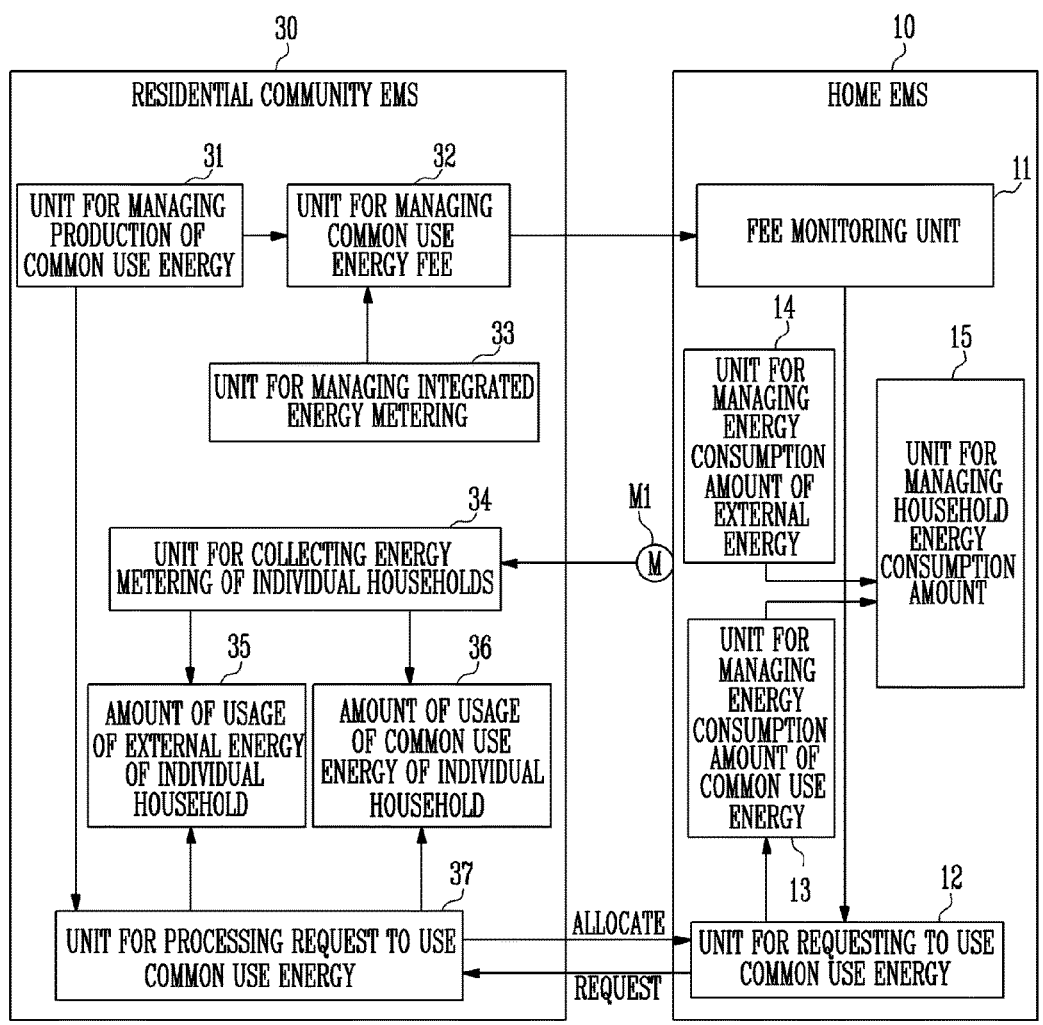
FIG. 2 is a view illustrating in detail a home EMS and a residential community EMS.

FIG. 2 is a view illustrating in detail a home EMS and a residential community EMS.

Referring to FIG. 2, for ease in explaining, in this embodiment, explanation will be made on one of the plurality of EMS 10 and the residential community EMS 30.

The home EMS 10 may divide the measurement values of individual household energy meter M1 into an amount of usage of external energy supplied from an energy operator, and an amount of usage of common use energy supplied from the unit for supplying common use energy 20, and manage them separately. Furthermore, the home EMS 10 may compare a unit fee of the external energy computed based on the accumulative fee system of the energy operator with a unit fee of the common use energy, and when it is determined that the unit fee of the common use energy is less expensive, the home EMS 10 generates and transmits a signal requesting to use common use energy to the residential community EMS 20. For this purpose, the home EMS 10 may include a fee monitoring unit 11, unit for requesting to use common use energy 12, unit for managing energy consumption amount of common use energy 13, unit for managing energy consumption amount of external energy 14, and unit for managing household energy consumption amount 15.

In another embodiment, the home EMS 10 may receive and store the common use energy being supplied from the residential community EMS 30, and supply the stored common use energy to household loads. Furthermore, the home EMS 10 may provide the energy that is has to the residential community EMS 30 or to a home EMS 10 of another household.

The residential community EMS 30 may receive measurement values of the individual household energy meter M1 from the home EMS 10, and divide the measurement values into an amount of usage of external energy supplied from an energy operator, and an amount of usage of common use energy supplied from the unit for supplying common use energy 20, and manage them separately. Furthermore, the common use residential community EMS 30 may determine a unit fee of the common use energy and then notify the plurality of home EMS 10 of the determined unit fee. For this purpose, the residential community EMS 30 may include a unit for managing production of common use energy 31, unit for managing common use energy fee 32, unit for managing integrated energy metering 33, unit for collecting individual household energy metering 34, unit for managing amount of usage of external energy of individual households 35, unit for managing amount of usage of common use energy of individual households 36, and unit for processing a request to use common use energy 37.

For example, in a residential community energy management system environment, measurement values in the individual household energy meter M1 that is installed in each individual household and that provides metering functions for the flow of energy in both directions are read and managed by the residential community EMS 30 at certain intervals, the values being managed based on units of time period for claiming energy fees (for example, monthly). Furthermore, the energy metering values of individual households of the residential community EMS 30 have structures that can be divided into the external energy consumption amount being provided from an energy operator and the common use energy consumption amount produced within the residential community and that can be managed separately. That is, the individual household energy metering values are determined by a sum of the amount of usage of the common use energy being supplied by the unit for supplying common use energy 20 and the external energy metering value from the energy supplier, and the total amount of usage of the common use energy within the residential community is the same as the sum of the individual household common use energy metering values allocated since there were requests for common use by the entire households.

Herein, prices of the common use energy may be announced by the residential community EMS 30 to individual households of the residential community in units of certain time periods based on fluctuations in prices in consideration of the total amount of usage of the common use energy within the residential community. The algorithm of the prices to be announced may be computed through a separate computing algorithm, but in an embodiment, the algorithm may be computed based on a unit fee allocated to each household according to their accumulated usage amount. Furthermore, this basis of unit fee may be a subject for comparison with the fee for the external energy being supplied by the energy operator that each individual household uses. Therefore, the fee to be allocated must be as inexpensive as possible.

The fee monitoring unit 11 monitors the common use energy storage amount being notified by the residential community EMS 30 and the common use energy unit fee, and compares the notified common use energy unit fee with the external energy unit fee, and predicts the accumulated fees of the external energy. The unit for requesting to use common use energy 12 requests using the common use energy depending on the determination by the fee monitoring unit 11, and enables the common use energy usage amount to be allocated by the residential community EMS 30 to the unit for managing energy consumption amount of external energy 14 so that it can be separated into external energy consumption amount and common use energy consumption amount in the unit for managing household energy consumption amount 15, and be managed separately. In an embodiment of requesting to use common use energy of the unit for requesting to use common use energy 12, it is possible to consider a use request based on price and a use request based on reservation. The use request based on price refers to a request to use common use energy when the price of the external energy being used in an individual household is higher than the price of common use energy, whereas the use request based on reservation refers to a request to use common use energy by predicting one's amount of usage of the common use energy and one's energy fee and then making reservations to use common use energy at predetermined times, beforehand.

The common use energy fee managing unit 32 determines and announces a unit fee of common use energy based on the production amount of the common use energy production managing unit 31 and the total average energy consumption of the integrated energy metering managing unit 33. Furthermore, the individual household energy metering collecting unit 34 allocates an amount of usage of energy of an individual household subscribed by an individual household energy meter M1 and allocates a requested usage amount of common use energy by a unit for processing requests to use common use energy 37 to each individual household, and transmits the allocated amount to the individual household external energy usage amount managing unit 35 and the individual household common use energy usage amount managing unit 36. As such, the residential community EMS 30 enables dividing an amount of usage of energy of an individual household into amount of usage of external energy and amount of usage of common use energy and managing the same, so that an individual household is charged with a suitable usage fee for common use energy.

Figure 3:
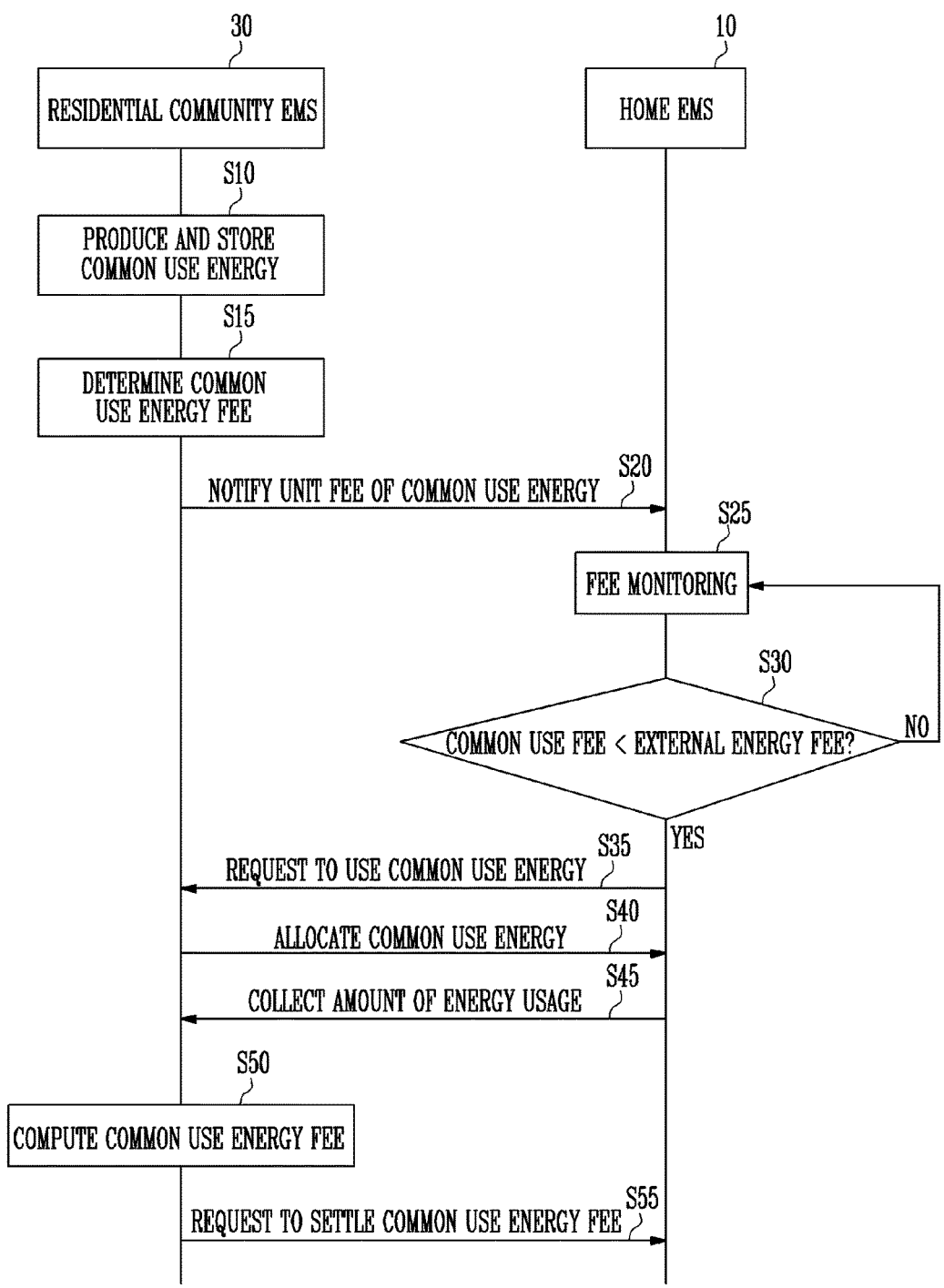
FIG. 3 is a control flowchart of an energy management system for a residential community that shares energy resources according to an embodiment of the present disclosure.

FIG. 3 is a control flowchart of an energy management system for a residential community that shares energy resources according to an embodiment of the present disclosure.

Referring to FIG. 3, the residential community EMS 30 produces and stores common use energy (S10). The residential community EMS 30 may control the unit for producing common use energy 21 and the storage unit for common use energy 22 to produce and charge common use energy. The residential community EMS 30 determines a unit fee of common use energy (S15). The residential community EMS 30 may determine a unit fee of common use energy based on the production amount of common use energy and the energy usage amount of the entire plurality of home EMS 10. It is desirable that the unit fee of common use energy determined is as inexpensive as possible than a unit fee of a certain accumulated level of external energy.

The residential community EMS 20 notifies the unit fee of common use energy determined at step S15 (S20). For example, the common use energy fee managing unit 32 determines a unit fee of common use energy based on the production amount of common use energy of the common use energy production managing unit 31 and the total average energy consumption of the integrated energy metering managing unit 33, and notifies the determined unit fee. The residential community EMS 30 may make a notification every time a unit fee of common use energy changes or at every certain period.

The home EMS 10 monitors the fee of an individual household (S25). Then, the home EMS 10 compares the unit fee of external energy and the unit fee of common use energy (S30). For example, the fee monitoring unit 11 monitors the storage amount of common use energy and the unit fee of common use energy being notified by the residential community EMS 30, compares the notified unit fee of common use energy and the fee of external energy, and predicts the accumulated fee of external energy.

At step 30 (S30), if the unit fee of external energy is higher than the unit fee of common use energy, the home EMS 10 transmits a signal requesting to use common use energy to the residential community EMS 30 (S35). That is, according to an accumulative fee system of external energy, when an accumulated level is low, the unit fee of external energy is used, but when the accumulated level increases and the unit fee of external energy is higher than the unit fee of common use energy, the external energy is stopped from being used, and a request to use common use energy is made.

In response to the signal requesting to use common use energy transmitted from a home EMS 10, the residential community EMS 30 allocates common use energy to the home EMS 10 that transmitted the signal requesting to use common use energy (S40). Herein, the allocation amount may be predetermined such that the common use energy is divided evenly to the plurality of home EMS 10, or may be determined on a variable basis such that a suitable amount is allocated according to the storage amount of the common use energy at the point of the request.

The residential community EMS 30 collects the amount of usage of common use energy from the home EMS 10. For example, measurement values of the individual household energy meter M1 are read and managed by the residential community EMS 30 at a certain time interval, and the corresponding values are managed based on units of time period for claiming energy fees (for example, monthly). Furthermore, the energy metering values of individual households of the residential community EMS 30 have structures that can be divided into the external energy consumption being provided from an energy operator and the common use energy consumption produced within the residential community and that can be managed separately.

The residential community EMS 30 computes a common energy fee of an individual household based on an amount of usage of common use energy (S50). Furthermore, the residential community EMS 30 requests the individual household to settle the common energy fee (S55). The residential community EMS 30 may separate the amount of usage of individual households into the amount of usage of external energy and the amount of usage of common use energy, and manage the same, and enable charging individual households suitable usage fees for the common use energy.

In the drawings and specification, there have been disclosed typical exemplary embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. An energy management system for a residential community that shares energy, the system comprising:
    a plurality of home EMS (Energy Management System) provided in individual households;
    a unit for supplying common use energy having a unit for producing common use energy, and a storage unit for charging the produced common use energy; and
    a residential community EMS configured to manage production and charging of the common use energy, and in response to receiving a signal requesting to use the common use energy transmitted from a home EMS supply, to control the unit for supplying the common use energy to supply the common use energy to the home EMS that transmitted the signal requesting to use the common use energy,
    wherein the unit for supplying common use energy comprises a production apparatus energy metering function for measuring an amount of energy usage of common use energy being supplied to the plurality of home EMS,
    wherein the residential community EMS receives external energy from an energy operator through an energy grid, and comprises a supervisory energy meter for measuring the amount of usage of the external energy
    wherein the residential community EMS determines a unit fee of the common use energy based on the amount of usage of the common use energy and the amount of usage of all of the plurality of home EMS, and notifies the determined unit fee to the plurality of home EMS, and
    wherein each of the plurality of EMS compares the computed unit fee of the external energy based on an accumulative fee system of the energy operator and the unit fee of the common use energy, and in response to determining that the unit fee of the common use energy is less expensive, generates a signal requesting the residential community EMS to use the common use energy,
    wherein each of the plurality of home EMS includes an individual household energy meter function for measuring an amount of usage of energy being consumed in each individual household,
    wherein the residential community EMS collects and manages measurement values of the energy meter provided in each of the plurality of home EMS either at certain intervals or in real time, and
    wherein the residential community EMS and the plurality of home EMS divide the measurement values of individual household energy meters into an amount of usage of external energy supplied from an energy operator and an amount of usage of common use energy supplied from the unit for supplying common use energy, and manage them separately.

2. The system according to claim 1, wherein the residential community EMS computes the unit fee of the common use energy based on the amount of usage of the common use energy and the unit fee of the common use energy of each of the plurality of EMS, and requests each home EMS to settle the computed the unit fee of the common use energy.

3. The system according to claim 1, wherein each of the plurality of EMS predicts an energy usage amount and energy fee of itself, and makes reservations beforehand for using the common use energy at a predetermined time.

4. The system according to claim 1, wherein the home EMS, unit for supplying common use energy, and residential community EMS are connected via a CAN (Controller Area Network).

* * * * *